(12) United States Patent
Li et al.

(10) Patent No.: US 11,378,490 B2
(45) Date of Patent: Jul. 5, 2022

(54) TRANSMISSION SHAFT ASSEMBLY FOR USE IN SEQUENTIAL TEST OF FLEXIBLE THIN-WALLED BEARINGS

(71) Applicant: SOUTH CHINA UNIVERSITY OF TECHNOLOGY, Guangdong (CN)

(72) Inventors: Weiguang Li, Guangdong (CN); Zhen Li, Guangdong (CN); Xin Lin, Guangdong (CN); Hui Chen, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 55 days.

(21) Appl. No.: 17/251,213

(22) PCT Filed: Oct. 31, 2018

(86) PCT No.: PCT/CN2018/113226
§ 371 (c)(1),
(2) Date: Dec. 11, 2020

(87) PCT Pub. No.: WO2019/237639
PCT Pub. Date: Dec. 19, 2019

(65) Prior Publication Data
US 2021/0247270 A1  Aug. 12, 2021

(30) Foreign Application Priority Data
Jun. 12, 2018 (CN) .......................... 201810598389.2

(51) Int. Cl.
*G01M 13/04* (2019.01)
(52) U.S. Cl.
CPC .................................. *G01M 13/04* (2013.01)

(58) Field of Classification Search
CPC ..................................................... G01M 13/04
See application file for complete search history.

(56) References Cited

U.S. PATENT DOCUMENTS

| 3,724,257 | A | 4/1973 | Sims et al. |
| 10,288,525 | B2 * | 5/2019 | Ferm ........................ G01M 9/04 |

(Continued)

FOREIGN PATENT DOCUMENTS

| CN | 104535321 | 4/2015 |
| CN | 105784365 | 7/2016 |

(Continued)

OTHER PUBLICATIONS

"International Search Report (Form PCT/ISA/210) of PCT/CN2018/113226," dated Mar. 5, 2019, pp. 1-4.

*Primary Examiner* — Eric S. McCall
(74) *Attorney, Agent, or Firm* — JCIPRNET

(57) ABSTRACT

A transmission shaft assembly for use in a sequential test of flexible thin-walled bearings includes a power connecting member, a clamping device and a plurality of bearing mounting kits. The bearing mounting kits are located between the power connecting member and the clamping device. The clamping device penetrates a central bore of each of the bearing mounting kits and is connected to the power connecting member. The power connecting member, the clamping device and the bearing mounting kits are connected into one piece. The power connecting member includes a spindle shank and a blind rivet. The bearing mounting kit includes a bearing mounting sleeve seat, a rear retaining ring, a front retaining ring, a bearing locking bolt and a tightening nut. The clamping device includes a clamping bolt, a washer and a spring washer.

13 Claims, 3 Drawing Sheets

(56) References Cited

U.S. PATENT DOCUMENTS

| | | | |
|---|---|---|---|
| 10,371,598 B1* | 8/2019 | Nation | G01M 13/04 |
| 11,283,328 B2* | 3/2022 | Dharan | C21D 9/00 |
| 2016/0033362 A1* | 2/2016 | Taguchi | G01M 13/045 |
| | | | 73/593 |
| 2016/0139000 A1* | 5/2016 | Karasawa | G01M 13/04 |
| | | | 73/865.9 |
| 2016/0282225 A1* | 9/2016 | Teramoto | G01M 7/027 |
| 2018/0045607 A1* | 2/2018 | Elmose | G01M 13/04 |
| 2018/0136081 A1* | 5/2018 | Lee | G01D 5/28 |
| 2018/0257129 A1* | 9/2018 | Kikuchi | B21J 9/20 |
| 2021/0072115 A1* | 3/2021 | McKinney | G01M 13/04 |

FOREIGN PATENT DOCUMENTS

| | | |
|---|---|---|
| CN | 106523522 | 3/2017 |
| CN | 108692940 | 10/2018 |

* cited by examiner

TRANSMISSION SHAFT ASSEMBLY FOR USE IN SEQUENTIAL TEST OF FLEXIBLE THIN-WALLED BEARINGS

CROSS-REFERENCE TO RELATED APPLICATION

This application is a 371 of international application of PCT application serial no. PCT/CN2018/113226, filed on Oct. 31, 2018, which claims the priority benefit of China application no. 201810598389.2, filed on Jun. 12, 2018. The entirety of each of the above mentioned patent applications is hereby incorporated by reference herein and made a part of this specification.

BACKGROUND

Technical Field

The present invention relates to a transmission shaft assembly for use in a sequential test of flexible thin-walled bearings, which is suitable for the sequential test of the thin-walled bearings by mounting multiple sets of flexible thin-walled bearings on a bearing mounting body in a performance test beds of the flexible thin-walled bearings, and belongs to the field of machine design.

Description of Related Art

As a core base component of an industrial robot, a harmonic reducer has the characteristics of high accuracy, high bearing capacity, wide transmission ratio range, and the like. At present, a bottleneck for industrialization of domestic industrial robots lies in research and development of a harmonic reducer technology. A flexible thin-walled bearing is a core component of the harmonic reducer, which plays a vital role in an overall performance of the harmonic reducer. Under a working condition, the flexible thin-walled bearing not only bears elastic deformation under extrusion of an elliptical shaft closely matched with an inner ring of the thin-walled bearing, but also bears an alternating stress caused by operating of the bearing itself. In the case of unsatisfactory working conditions, the flexible thin-walled bearing also bears different static or dynamic loads from the outside. Therefore, in a research and development process of the flexible thin-walled bearing for the harmonic reducer, stability, rotation accuracy and service life of a precision flexible thin-walled bearing need to be tested. A sequential test is one of the tests, which needs to test a plurality of flexible thin-walled bearings for the harmonic reducer at the same time. Moreover, test conditions need to be consistent. Finally, a failure rate of tested bearings is judged to determine whether the tested bearings are qualified or not.

In an actual performance test of the flexible thin-walled bearing, the inner ring of the flexible thin-walled bearing needs to be mounted on an elliptical shaft shoulder.

SUMMARY

Aiming at the above technical problems, the present invention aims to provide a transmission shaft assembly for use in a sequential test of flexible thin-walled bearings, which is convenient to assemble and disassemble, safe and reliable in working, and increases flexibility and reliability of a test process.

The present invention is realized by following technical solutions.

A transmission shaft assembly for use in a sequential test of flexible thin-walled bearings includes a power connecting member, a clamping device and a plurality of bearing mounting kits that are connected in sequence. The bearing mounting kits that are connected in sequence are located between the power connecting member and the clamping device. The clamping device penetrates a central bore of each of the bearing mounting kit and is connected to the power connecting member, and the power connecting member, the clamping device and the bearing mounting kits are connected into one piece.

The power connecting member includes a spindle shank and a blind rivet threadedly connected to a front end of the spindle shank, a rear end of the spindle shank is provided with a circular truncated cone connected to the bearing mounting kits, and a center of the rear end is provided with a threaded bore.

The bearing mounting kit includes a hollow bearing mounting sleeve seat, a rear retaining ring, a front retaining ring, a bearing locking bolt and a tightening nut. A front end of the bearing mounting sleeve seat is provided with a taper bore, a rear end of the bearing mounting sleeve seat is provided with a frustum, an outer peripheral wall of a middle portion of the bearing mounting sleeve seat is provided with an elliptical shaft shoulder for mounting a thin-walled bearing in interference fit. The rear retaining ring and the front retaining ring are fixedly arranged on both sides of the elliptical shaft shoulder through the bearing locking bolt and the tightening nut, so that axial movement of the bearing is limited, and the reliability of the test process is ensured.

The clamping device includes a clamping bolt, a washer and a spring washer. The clamping bolt penetrates the spring washer, the washer and the bearing mounting kits in sequence, and a front end of the clamping bolt is connected to the threaded bore at the rear end of the spindle shank through an external thread.

Further, a center of a tail end of the clamping bolt is provided with a conical bore matched with an ejector pin.

Further, a conicity ratio of the conical bore of the clamping bolt is 1:3.

Further, the taper bore and the frustum are respectively a circular taper bore and a circular frustum with a circular cross section. Matching between the circular frustum and the circular taper bore may be used for transmitting a torque and implementing automatic concentric positioning with the bearing mounting kits.

Further, the taper bore and the frustum are respectively an elliptical frustum and an elliptical taper bore with an elliptical cross section. Matching between the elliptical frustum and the elliptical taper bore may be used for transmitting a large torque and implementing automatic concentric positioning with the bearing mounting kits.

Further, a conicity ratio of the taper bore and a conicity ratio of the frustum are 1:5.

Further, an axial ratio of the elliptical frustum and an axial ratio of the elliptical taper bore are 15:14.

Further, the front end of the spindle shank is provided with a conical portion with a conicity ratio of 7:24.

Further, a middle portion of the spindle shank is provided with a trapezoid-shaped clamping slot for clamping, disassembling and assembling.

Further, a diameter of the rear retaining ring of the bearing is larger than that of the front retaining ring, and one side of the rear retaining ring of the bearing close to the thin-walled bearing is provided with a step for clamping and fixing a holder, so that the holder is prevented from slipping during rotation after the thin-walled bearings are mounted on the elliptical shaft shoulder of the bearing mounting sleeve seat.

Compared with the prior art, the present invention is suitable for the sequential test of the thin-walled bearings, and a standard shank structure is used in the power connecting member, which may be directly matched with and connected to the high-speed electric spindle, thereby being convenient to mount. Meanwhile, a modular design is used in the bearing mounting sleeve seat, which may change a test solution by increasing or decreasing a number of the bearing mounting kits, thereby increasing flexibility and reliability of the test solution.

DESCRIPTION OF THE EMBODIMENTS

Figure 1:
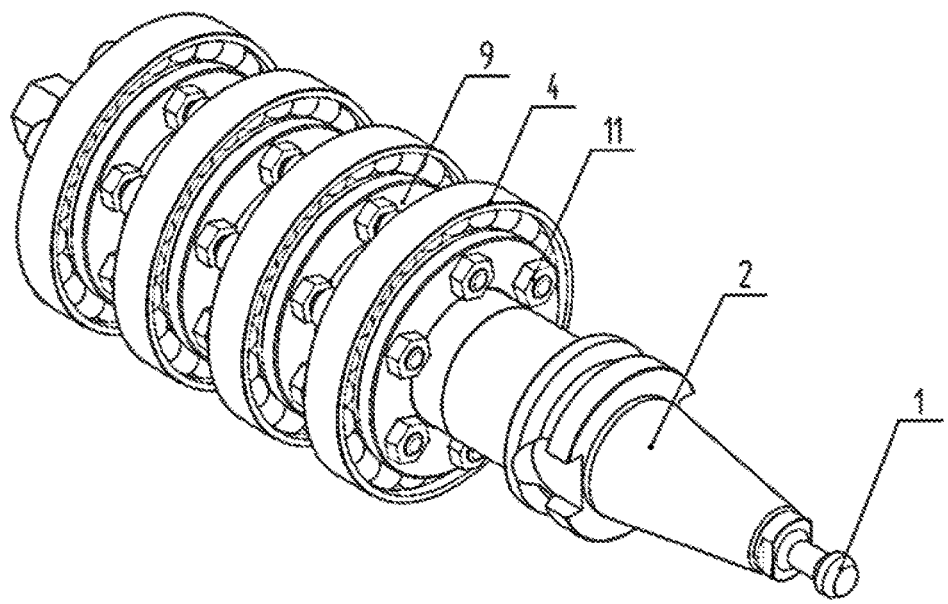
FIG. 1 is a front isometric diagram according to an embodiment of the present invention.
Figure 2:
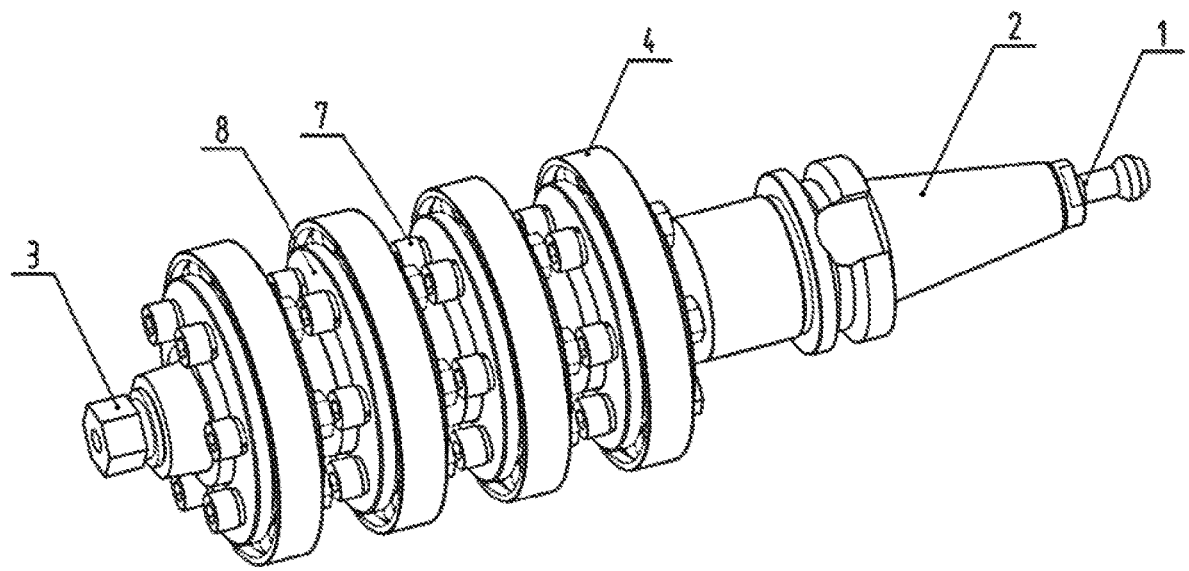
FIG. 2 is a rear isometric diagram according to the embodiment of the present invention.
Figure 3:
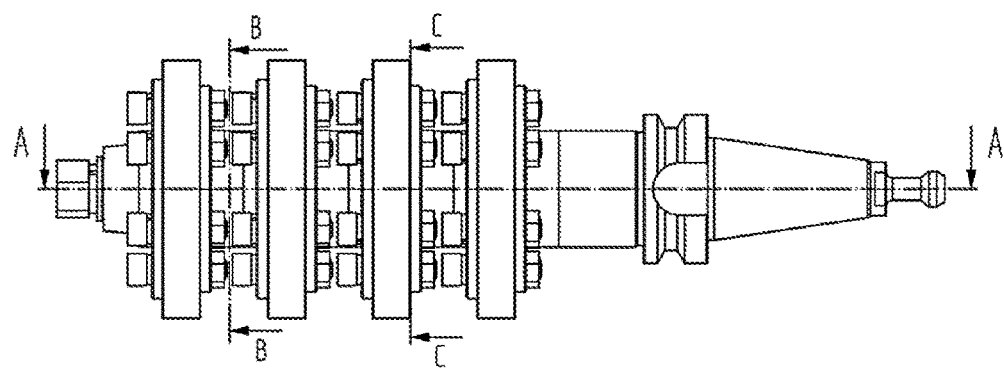
FIG. 3 is a front view according to the embodiment of the present invention.

The present invention is further described hereinafter with reference to the accompanying drawings and the embodiments.

Embodiment 1

With reference to FIG. 1 to FIG. 8, a transmission shaft assembly for use in a sequential test of flexible thin-walled bearings includes a power connecting member, a clamping device and a plurality of bearing mounting kits that are connected in sequence. The bearing mounting kits that are connected in sequence are located between the power connecting member and the clamping device. The clamping device penetrates a central bore of each of the bearing mounting kit and is connected to the power connecting member, and the power connecting member, the clamping device and the plurality of bearing mounting kits are connected into one piece.

The power connecting member includes a spindle shank 2 and a blind rivet 1 threadedly connected to a front end of the spindle shank 2. A component seal head is used as the blind rivet, which may be connected to a high-speed electric spindle, thereby being convenient to mount. A rear end of the spindle shank 2 is provided with a circular truncated cone connected to the bearing mounting kits, and a center of the rear end is provided with a threaded bore. The front end of the spindle shank is provided with a conical portion with a conicity ratio of 7:24, and a middle portion of the spindle shank 2 is provided with a trapezoid-shaped clamping slot convenient for clamping, disassembling and assembling.

The bearing mounting kit includes a hollow bearing mounting sleeve seat 10, a rear retaining ring 8, a front retaining ring 9, a bearing locking bolt 7 and a tightening nut 11. A front end of the bearing mounting sleeve seat 10 is provided with a taper bore, a rear end of the bearing mounting sleeve seat 10 is provided with a frustum, an outer peripheral wall of a middle portion of the bearing mounting sleeve seat 10 is provided with an elliptical shaft shoulder for mounting a thin-walled bearing 4 in interference fit. Multiple circular bores for the bearing locking bolts 7 to penetrate are uniformly arranged on the elliptical shaft shoulder (referring to FIG. 6). The rear retaining ring 8 and the front retaining ring 9 are fixedly arranged on both sides of the elliptical shaft shoulder through the bearing locking bolt 7 and the tightening nut 11, so that axial movement of the bearing is limited, and a reliability of a test process is ensured. Meanwhile, a diameter of the rear retaining ring 8 of the bearing is larger than that of the front retaining ring 9, and one side of the rear retaining ring 8 of the bearing close to the thin-walled bearing 4 is provided with a step for clamping and fixing a holder, so that the holder is prevented from slipping during rotation after the thin-walled bearings 4 are mounted on the elliptical shaft shoulder of the bearing mounting sleeve seat 10 (referring to FIG. 5 and FIG. 6).

The clamping device includes a clamping bolt 3, a washer 6 and a spring washer 5. The clamping bolt 3 penetrates the spring washer 5, the washer 6 and the bearing mounting kits in sequence, and a front end of the clamping bolt is connected to the threaded bore at the rear end of the spindle shank 2 through an external thread. A center of a tail end of the clamping bolt 3 is provided with a conical bore matched with an ejector pin and having a conicity ratio of 1:3, thereby being convenient and fast to align, and enhancing a stability of the test process.

Figure 4:
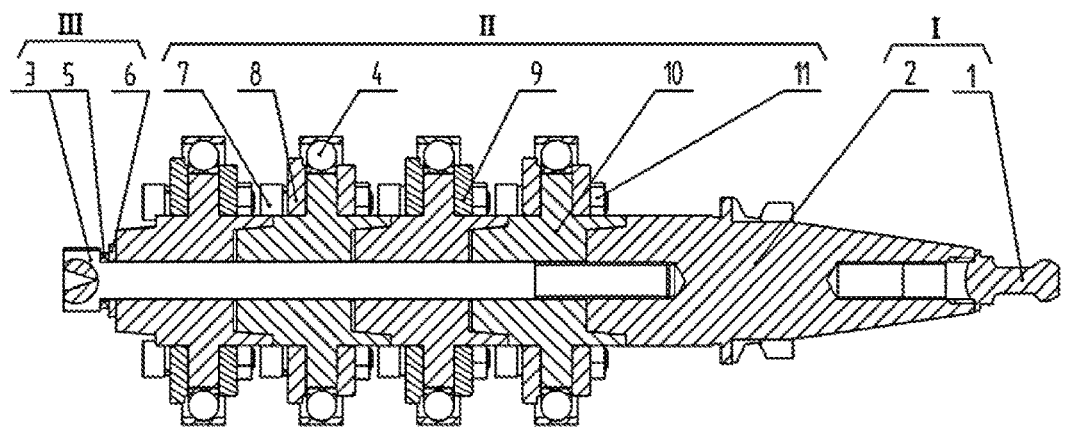
FIG. 4 is a cross-sectional view taken from line A-A in FIG. 2.
Figure 5:
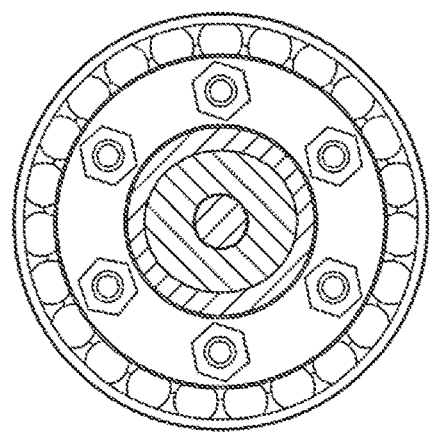
FIG. 5 is a cross-sectional view taken from line B-B in FIG. 2.
Figure 6:
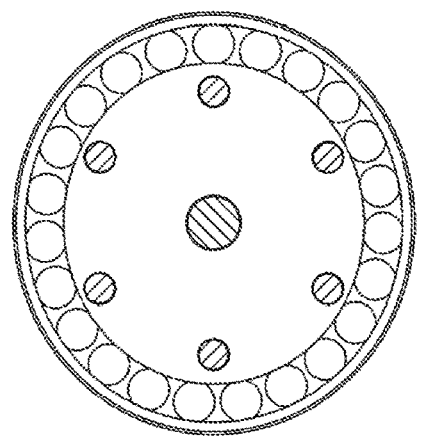
FIG. 6 is a cross-sectional view taken from line C-C in FIG. 2.
Figure 7:
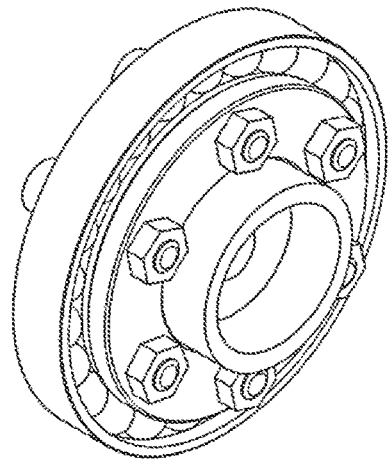
FIG. 7 is a front-end diagram of a bearing mounting kit according to the embodiment of the present invention.
Figure 8:
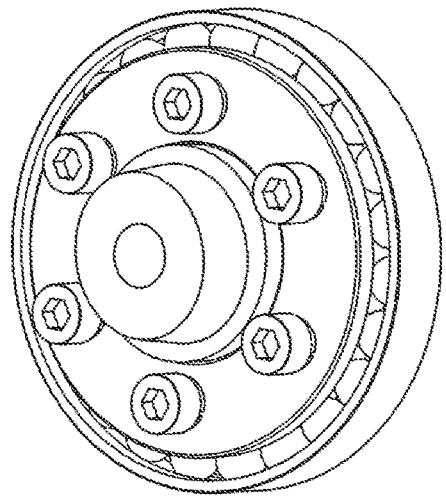
FIG. 8 is a rear-end diagram of the bearing mounting kit according to the embodiment of the present invention.

In the embodiment, as shown in FIG. 4, FIG. 7 and FIG. 8, either the circular truncated cone arranged at the rear end of the spindle shank 2 or the taper bores and the frustums arranged at the front and rear ends of the bearing mounting kits are respectively elliptical frustums and elliptical taper bores with elliptical cross sections. An axial ratio of the elliptical frustum and an axial ratio of the elliptical taper bore are 15:14, and a conicity ratio of the taper bore and a conicity ratio of the frustum are 1:5. The elliptical frustum may be used for transmitting a larger torque and implementing automatic concentric positioning with the bearing mounting kits.

In the embodiment, the bearing mounting kits may be increased or decreased according to a number of actually tested thin-walled bearings 4, while the clamping bolts 3 may be correspondingly processed into specifications with different lengths. Different numbers of bearing mounting kits that may be clamped by the clamping bolts with different specifications are provided, thereby being suitable for different test solutions. As shown in FIG. 4, the bearing mounting sleeve seat 10 and another bearing mounting sleeve seat 10 are connected together through interference fit of elliptical conical surfaces during mounting, which may make the bearing mounting kits rotate synchronously. The shaft shoulder has an elliptical outer edge structure, and the thin-walled bearings 4 are sleeved on the elliptical shaft shoulder of the corresponding bearing mounting sleeve seat 10, which may simulate actual operating conditions of the thin-walled bearings and flexibly adapt to different test requirements.

Embodiment 2

The embodiment is different from Embodiment 1 in that: both the taper bore and the frustum are a circular taper bore and a circular frustum with a circular cross section. The circular frustum may be used for transmitting a torque and implementing automatic concentric positioning with the bearing mounting kits. The circular frustum has a simple structure and is convenient to process, and is suitable for a test condition with a slightly less transmission torque.

The above embodiments are only preferred embodiments of the present invention, and are not intended to limit the embodiments of the present invention. Other changes or variations in different forms can also be made on the basis of the above description for those of ordinary skills in the art. It is not necessary and impossible to exhaust all the implementation modes here. Any modifications, equivalent substitutions and improvements made within the spirit and principle of the present invention should be included in the scope of the claims of the present invention.

What is claimed is:

1. A transmission shaft assembly for use in a sequential test of flexible thin-walled bearings, the transmission shaft assembly comprising a power connecting member, a clamping device and a plurality of bearing mounting kits that are connected in sequence, wherein the bearing mounting kits that are connected in sequence are located between the power connecting member and the clamping device, the clamping device penetrates a central bore of each of the bearing mounting kits and is connected to the power connecting member, and the power connecting member, the clamping device and the bearing mounting kits are connected into one piece;

the power connecting member comprises a spindle shank and a blind rivet threadedly connected to a front end of the spindle shank, a rear end of the spindle shank is provided with a circular truncated cone connected to the bearing mounting kits, and a center of the rear end is provided with a threaded bore;

the bearing mounting kit comprises a hollow bearing mounting sleeve seat, a rear retaining ring, a front retaining ring, a bearing locking bolt (7) and a tightening nut, a front end of the bearing mounting sleeve seat is provided with a taper bore, a rear end of the bearing mounting sleeve seat is provided with a frustum, an outer peripheral wall of a middle portion of the bearing mounting sleeve seat is provided with an elliptical shaft shoulder for mounting a thin-walled bearing in interference fit, and the rear retaining ring and the front retaining ring are fixedly arranged on both sides of the elliptical shaft shoulder through the bearing locking bolt and the tightening nut; and the clamping device comprises a clamping bolt, a washer and a spring washer, the clamping bolt penetrates the spring washer, the washer and the bearing mounting kits in sequence, and a front end of the clamping bolt is connected to the threaded bore at the rear end of the spindle shank through an external thread.

2. The transmission shaft assembly for use in the sequential test of the flexible thin-walled bearings according to claim 1, wherein a conicity ratio of the taper bore and a conicity ratio of the frustum are 1:5.

3. The transmission shaft assembly for use in the sequential test of the flexible thin-walled bearings according to claim 1, wherein a middle portion of the spindle shank is provided with a trapezoid-shaped clamping slot for clamping, disassembling and assembling.

4. The transmission shaft assembly for use in the sequential test of the flexible thin-walled bearings according to claim 1, wherein a diameter of the rear retaining ring of the bearing is larger than that of the front retaining ring, and one side of the rear retaining ring of the bearing close to the thin-walled bearing is provided with a step for clamping and fixing a holder.

5. The transmission shaft assembly for use in the sequential test of the flexible thin-walled bearings according to claim 1, wherein a center of a tail end of the clamping bolt is provided with a conical bore matched with an ejector pin.

6. The transmission shaft assembly for use in the sequential test of the flexible thin-walled bearings according to claim 5, wherein a conicity ratio of the conical bore of the clamping bolt is 1:3.

7. The transmission shaft assembly for use in the sequential test of the flexible thin-walled bearings according to claim 1, wherein the taper bore and the frustum are respectively a circular taper bore and a circular frustum with a circular cross section.

8. The transmission shaft assembly for use in the sequential test of the flexible thin-walled bearings according to claim 7, wherein a conicity ratio of the taper bore and a conicity ratio of the frustum are 1:5.

9. The transmission shaft assembly for use in the sequential test of the flexible thin-walled bearings according to claim 1, wherein the front end of the spindle shank is provided with a conical portion with a conicity ratio of 7:24.

10. The transmission shaft assembly for use in the sequential test of the flexible thin-walled bearings according to claim 9, wherein a middle portion of the spindle shank is provided with a trapezoid-shaped clamping slot for clamping, disassembling and assembling.

11. The transmission shaft assembly for use in the sequential test of the flexible thin-walled bearings according to claim 1, wherein the taper bore and the frustum are respectively an elliptical frustum and an elliptical taper bore with an elliptical cross section.

12. The transmission shaft assembly for use in the sequential test of the flexible thin-walled bearings according to claim 11, wherein an axial ratio of the elliptical frustum and an axial ratio of the elliptical taper bore are 15:14.

13. The transmission shaft assembly for use in the sequential test of the flexible thin-walled bearings according to claim 11, wherein a conicity ratio of the taper bore and a conicity ratio of the frustum are 1:5.

* * * * *